(12) United States Patent
Blazek et al.

(10) Patent No.: US 11,703,075 B1
(45) Date of Patent: Jul. 18, 2023

(54) BIASED EQUIVALENT STRENGTH THREADED JOINT FOR DISSIMILAR STRENGTH STRUCTURAL MATERIALS

(71) Applicant: The United States of America, as represented by the Secretary of the Navy, Arlington, VA (US)

(72) Inventors: Benjamin M. Blazek, Ridgecrest, CA (US); Lee R. Hardt, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 522 days.

(21) Appl. No.: 16/892,831

(22) Filed: Jun. 4, 2020

(51) Int. Cl.
*F16B 37/02* (2006.01)
*F16B 37/08* (2006.01)
*F16B 31/04* (2006.01)

(52) U.S. Cl.
CPC .............. *F16B 37/02* (2013.01); *F16B 31/04* (2013.01); *F16B 37/08* (2013.01)

(58) Field of Classification Search
CPC ... F16B 37/08; F16B 31/04; F16B 37/02; F16B 33/02; F16B 5/02; F16B 31/02; F16B 31/021; F16L 15/06
USPC ....................... 411/436, 366.1, 3, 9, 438, 411
See application file for complete search history.

(56) References Cited

U.S. PATENT DOCUMENTS

| | | | | |
|---|---|---|---|---|
| 0,603,721 | A * | 5/1898 | Avery | F16L 15/003 285/285.1 |
| 1,769,381 | A * | 7/1930 | Montgomery | E21B 17/043 285/90 |
| 3,054,145 | A * | 9/1962 | Hanns | F16B 33/006 425/545 |
| 4,770,448 | A * | 9/1988 | Strickland et al. | E21B 17/042 285/333 |
| 5,083,890 | A * | 1/1992 | Gabilondo | F16L 47/16 411/411 |
| 5,186,500 | A * | 2/1993 | Folkers | E21B 17/042 285/55 |
| 7,007,984 | B2* | 3/2006 | Church | F16L 15/002 285/333 |
| 10,408,593 | B1* | 9/2019 | Blazek et al. | F42B 12/207 |
| 10,408,594 | B1* | 9/2019 | Blazek et al. | F42C 19/02 |
| 10,767,683 | B2* | 9/2020 | Kalantari et al. | F16B 33/02 |
| 11,047,666 | B1* | 6/2021 | Blazek et al. | F42B 39/20 |
| 11,067,376 | B1* | 7/2021 | Blazek et al. | F42B 39/20 |
| 11,118,886 | B1* | 9/2021 | Blazek et al. | F42B 39/20 |
| 11,193,743 | B1* | 12/2021 | Blazek et al. | F42B 12/207 |

(Continued)

*Primary Examiner* — Victor D Batson
*Assistant Examiner* — Dil K. Magar
(74) *Attorney, Agent, or Firm* — Naval Air Weapons Center Weapons Division; James M. Saunders (57) ABSTRACT

Embodiments are directed to first and second structural members that are threadingly-engaged with each other. The first and second structural members are dissimilar strength materials. Each structural member configured with a plurality of threads for the threading engagement. The thread thickness of each thread in the plurality of threads for the first structural member is not equal to the thread thickness of each thread in the plurality of threads for the second structural member.

6 Claims, 7 Drawing Sheets

(56) References Cited

U.S. PATENT DOCUMENTS

| | | | |
|---|---|---|---|
| 2004/0108720 A1* | 6/2004 | Mallis | F16L 15/004 285/390 |
| 2004/0218991 A1* | 11/2004 | Sugimura | F16B 33/02 411/308 |
| 2004/0256856 A1* | 12/2004 | Spears | F16L 15/08 285/333 |
| 2005/0258650 A1* | 11/2005 | Swingley | F16L 15/006 285/390 |
| 2006/0012173 A1* | 1/2006 | Pinckney, Jr. et al. | F16L 15/006 285/386 |
| 2008/0089759 A1* | 4/2008 | Diekmeyer | B01D 53/261 411/311 |
| 2008/0277932 A1* | 11/2008 | Grubert et al. | F16B 37/12 285/334 |
| 2010/0172717 A1* | 7/2010 | Corbett et al. | F16B 33/00 411/366.1 |
| 2015/0139749 A1* | 5/2015 | Metten et al. | F16B 5/025 411/114 |
| 2015/0300535 A1* | 10/2015 | Ma et al. | F16L 47/16 138/109 |
| 2015/0316180 A1* | 11/2015 | Marchand | F16L 15/08 285/390 |
| 2015/0368986 A1* | 12/2015 | Narikawa et al. | E21B 17/042 166/380 |
| 2017/0261151 A1* | 9/2017 | Hsu | F16M 11/32 |
| 2017/0271825 A1* | 9/2017 | Roe et al. | H01R 13/629 |
| 2018/0106399 A1* | 4/2018 | Freed et al. | F16L 15/06 |

* cited by examiner

BIASED EQUIVALENT STRENGTH THREADED JOINT FOR DISSIMILAR STRENGTH STRUCTURAL MATERIALS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

Embodiments generally relate to joining dissimilar strength structural materials.

It is to be understood that the foregoing general description and the following detailed description are exemplary and explanatory only and are not to be viewed as being restrictive of the embodiments, as claimed. Further advantages will be apparent after a review of the following detailed description of the disclosed embodiments, which are illustrated schematically in the accompanying drawings and in the appended claims.

DETAILED DESCRIPTION OF EMBODIMENTS

Embodiments may be understood more readily by reference in the following detailed description taking in connection with the accompanying figures and examples. It is understood that embodiments are not limited to the specific devices, methods, conditions or parameters described and/or shown herein, and that the terminology used herein is for the purpose of describing particular embodiments by way of example only and is not intended to be limiting of the claimed embodiments. Also, as used in the specification and appended claims, the singular forms "a," "an," and "the" include the plural.

Embodiments generally relate to joining dissimilar strength structural materials in several environments, including industrial, marine, insensitive munitions (IM), and shock mitigation operating environments. The embodiments provide optimized means of non-permanently joining, sometimes referred to as jointing, of structural materials having different material strengths. The structural materials are also referred to as structural members, structural parts, and similar variations. The embodiments introduce thread orientations based on efficiency that optimizes non-permanent jointing of dissimilar strength structural members. This facilitates release under severe environments, including slow cook-off (SCO) and fast cook-off (FCO) environments.

Current methods of joining two materials of different material strengths can be accomplished with current standard threads but result in inefficient configurations with overly large thread engagement. The longer thread engagement is used to provide more shear area for the weaker material, however the stronger material also gains shear area making it overly strong, which increases parasitic weight and/or volume.

The embodiments solve this problem by using a novel thread form that allows for unequal bilateral distribution between the two materials. This form enables tailoring additional shear area to just the weaker material, so that both the threads in both materials are adequately, and not overly, strong, with minimal increase in length of the thread engagement. Additionally, while non-permanent, certain adverse environments drive a need for a controlled release between jointed parts. Current threaded joints of two strong materials in these environments are considered permanent in these environments. The disclosed embodiments opens trade space to enable a releasable design, as desired in adverse environments, without compromising strength in the operating environments. Moreover, standard threaded joints of high-strength materials can amplify or increase shocks and/or accelerations transmitted to connected subassemblies. The embodiments offer the ability for the inclusion of lower strength materials with their shock mitigating properties with minimal compromise in strength of the overall joint.

Conventions, Definitions, and Parameters

At the outset, it is helpful to describe various conventions, definitions, and parameters associated with embodiments of the invention. Some of the embodiments can be referred to as an "unequal bilateral distribution" of the thread pitch between different strength structural members.

Unequal: Embodiments sometimes use "unequal" to describe the thread thicknesses of the weaker structural member being unequal, i.e. not equal, to the thread thickness of the stronger structural member. In layman's terms, the thread thicknesses in the two structural members are not the same. Stated differently, the thickness of internal threads are different than the thickness of external threads. This is shown in detail mathematically later in the theory of operation section.

Bilateral: The word "bilateral" is used to show that the pitch of the thread, i.e. the axial distance between two repeated points of adjacent revolutions, is wholly distributed between the two unequal thread thicknesses, that of the weaker structural member and that of the stronger structural member. More simply, in the embodiments, pitch is equal to the thread thickness of the weaker structural member plus the thread thickness of the stronger structural member. This is different than normal/standard threads where the thread thicknesses are the same, leading to pitch being equal to two times the thread thickness, where the thread thickness of the weaker material is the same as the thread thickness of the stronger material. This is shown in greater detail herein.

Bilateral Equivalent Strength Thread/Threaded: Some embodiments may also be referred to as a "biased equivalent strength thread," "biased equivalent strength threaded joint," or a similar variation. In general, the term(s) mean that the thread thicknesses of the mating parts are biased based on their individual material strength properties such that the resultant thread(s) offer equivalent strengths. Specifically, biased refers to preferentially allocating more of the pitch to the thread thickness of the weaker material. Equivalent strength refers to the overall shear or tear-out strength of the threaded part comprised of the weaker material as being equal to that of the part comprised of the stronger material. Therefore, due to the biased thread thickness distribution in the embodiments, the strength of two different threadingly-engaged structural members or parts are substantially equal. Shear tear-out of the thread is substantially-equal, sometimes referred to as nearly equal, between the two structural members or parts, even though the two respective parts are comprised of materials having vastly different strengths.

Structural Member(s): Some structural features are referred to as "structural member," such as "first structural member" and "second structural member." Other components in alternative embodiments are referred to as rings of various types, such as various types of "release ring(s)" and "shock damping ring(s)." Descriptions are used to designate structural components and strength of the respective materials. Structural members composed of weaker material(s) in their respective embodiments are designated with reference characters 237A, 237B, 237C, and 352.

Interference: The term "interference" is used, especially later with respect to a shock mitigation embodiment depicted in FIG. 5 where the weaker material embodies similar to a threaded adapter between two other members comprised of higher strength material(s), in which the internal and external threads are timed such that they do not superimpose/overlap. Interference means the minor diameter of the internal thread, in the outermost part, is smaller than the major diameter of the external thread, in the innermost part, which creates the interference. The term is used in the discussion to prevent the release of a fuzewell from a warhead case if a threaded release ring structurally fails.

Current IM release practices have limited or no secondary vent areas and rely on the increasing pressure and heat of reaction to structurally fail, requiring high pressures and violence, the attachment interface and eject the fuze and or fuzewell. Such attachment interfaces, when comprised of high strength materials require such high pressures that the release often occurs with violence exceeding the failure thresholds set by insensitive munition requirements. Other similar attachment interfaces, when utilizing a lower strength material mating the two high strength parts (warhead case and fuzewell), often result in either an overall weaker joint or in excessive parasitic volume which reduce performance in the operating environment. Also, the release of current IM practices require high temperatures for either sufficient thermal degradation of the attachment mechanism or thermal decomposition of the energetic to provide release. Embodiments also solve this problem by offering additional secondary vent paths having unique geometrical configurations that assist in local degradation of the attachment mechanism. Embodiments also improve fuze survivability by reducing shocks transmitted to the fuze. Embodiments are also used to restrain smaller diameter parts within a larger diameter shell or case.

Structural features are also included that reduce the shock experienced by a munition fuze due to, but not limited to, loads during weapon penetration and pyro-shock. Component material and orientation provides damping and impedance mismatches across interfaces. This additional damping, as well as impedance mismatches, results in reduced shock and vibrational pressures and stresses transmitted to munition fuze(s). Based on this, embodiments are applicable to penetrating and non-penetrating warhead, bomb, and rocket motor families in which a plug or base is desired to provide variable venting and/or release.

Although embodiments are described in considerable detail, including references to certain versions thereof, other versions are possible such as, for example, orienting and/or attaching components in different fashion. Therefore, the spirit and scope of the appended claims should not be limited to the description of versions included herein.

In the accompanying drawings, like reference numbers indicate like elements. Reference characters 100, 200, 250, 275, 300, 400, 450, and 500 depict various embodiments, sometimes referred to as mechanisms, apparatuses, devices, systems, and similar terminology. Several views are presented to depict some, though not all, of the possible orientations of the embodiments. Figures may depict section views and, in some instances, partial section views for ease of viewing. Section hatching patterning is for illustrative purposes only to aid in viewing and should not be construed as being limiting or directed to a particular material or materials. Components used, along with their respective reference characters, are depicted in the drawings. References made to "munition(s)," and "fuze(s)," are generic and not to any particular component, unless noted otherwise.

Components depicted are dimensioned to be close-fitting (unless noted otherwise) and to maintain structural integrity both during storage and while in use. With respect to the close-up section views in FIGS. 3A, 4A, 4B, and 5, slight gaps are shown for ease of viewing the different threads, even though when mated, the components are close-fitting. Likewise, with respect to the close-up section views (FIGS. 3A, 4A, 4B, and 5) hatching is not shown for ease of viewing. Similarly, references to components such as screws, adhesives, and the like may be made, but the drawings do not specifically show these for ease of viewing.

Figure 3A:
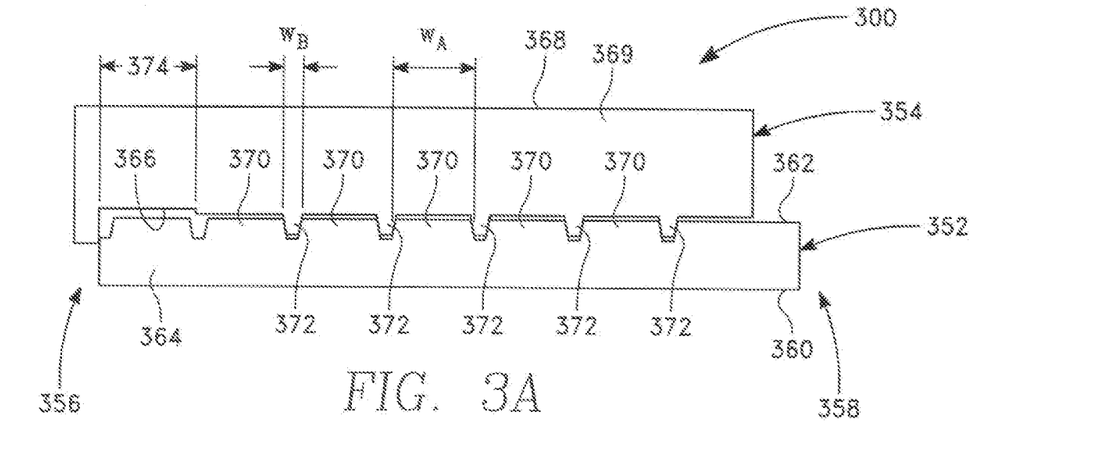
FIG. 3A is a close-up section view of a biased equivalent strength threaded joint for joining dissimilar strength structural materials, according to some embodiments.
Figure 3B:
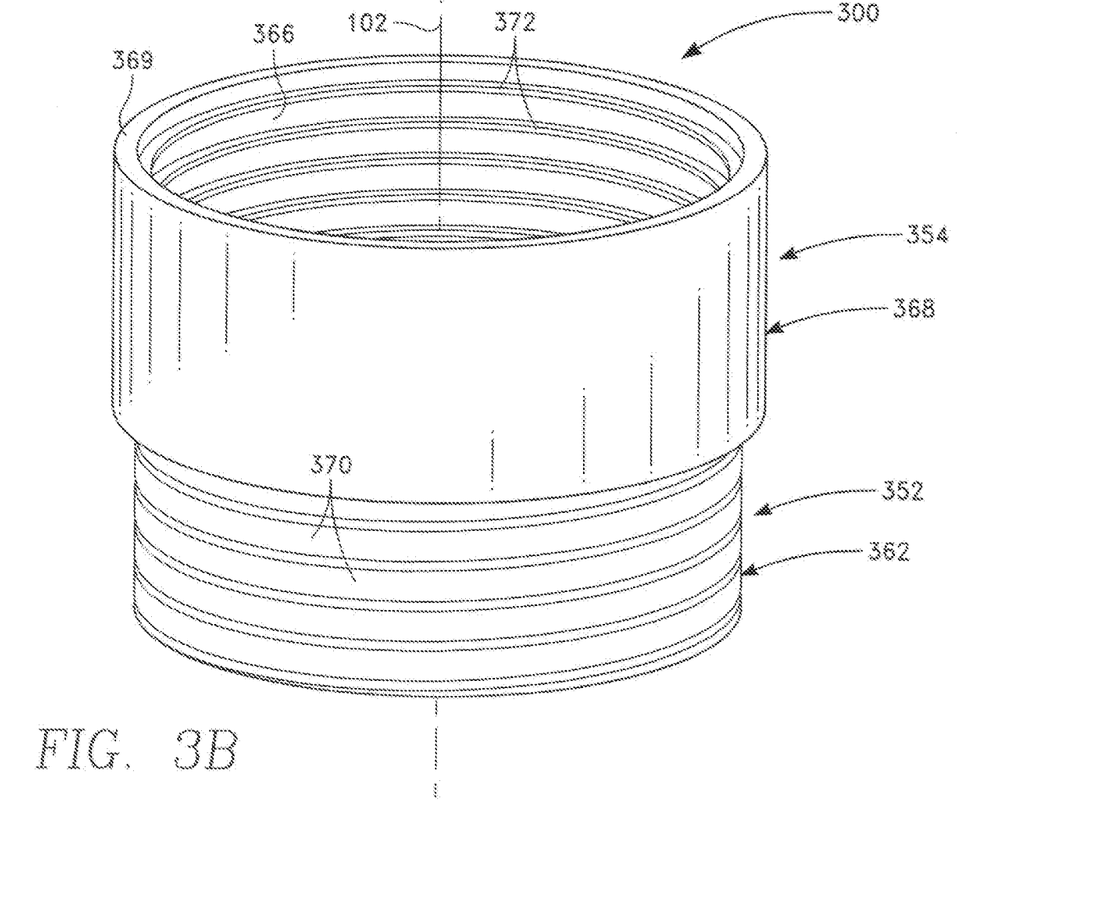
FIG. 3B is an exemplary isometric view showing an assembly of the biased equivalent strength threaded joint of FIG. 3A.

Biased Equivalent Strength Threaded Joint Embodiment - FIGS. 3A & 3B

Referring to FIGS. 3A & 3B, a proof of concept example is presented and illustrates a fabricated prototype. The embodiment includes a biased equivalent strength threaded (BEST) joint 300 for dissimilar strength materials. FIG. 3A is a very close-up section view showing the correlation between component threads. FIG. 3B depicts the BEST joint 300 in an isometric view and also helpful in correlating features of the embodiment, especially with respect to showing that thread thicknesses between mating components are not equal.

In this embodiment, the BEST joint 300 includes a first structural member 352 and a second structural member 354. The first structural member 352 has a proximal end 356, a distal end 358; an inner surface 360, a threaded outer surface 362, and a wall 364 defined by the inner surface and the outer surface. The proximal and distal ends 356 & 358 can also be referred to as first and second ends, respectively. The first structural member 352 is depicted as a hollow annular member. The inner surface 360 is smooth in this embodiment. Alternatively, the first structural member 352 can be solid and, therefore, not have an inner surface, without detracting from the merits or generalities of the embodiments. As with other embodiments, the first structural member 352 is centered about a central longitudinal axis (102 in FIG. 3B).

The second structural member 354 has an inner surface 366 and an outer surface 368. The inner surface 366 is threaded and the outer surface 368 is smooth, sometimes referred to as a threaded inner surface and smooth outer surface. The second structural member 354 has a wall 369 defined by the threaded inner surface 366 and the smooth outer surface 368. The second structural member 354 is concentric about the first structural member 352. The first and second structural members 352 & 354 are configured to threadingly-engage with each other through helically revolved flank surfaces.

The outer surface 362 of the first structural member 352 has a plurality of threads 370 with a thread thickness, $w_A$. The threaded inner surface 366 of the second structural member 354 has a plurality of threads 372 with a thread thickness, $w_B$. The thread thickness, $w_A$, of the outer surface 362 of the first structural member 352 and the thread thickness, $w_B$, of the threaded inner surface 366 of the second structural member 354 are not equal.

The below equations are applicable to all embodiments discussed herein. The respective thread thicknesses are not the same and are mathematically defined as follows:

$$w_A = \frac{P}{\left(1 + \dfrac{S_{allow,A}}{s \cdot S_{allow,B}}\right)};$$ (Equation No. 1)

$$w_B = \frac{P}{\left(1 + \dfrac{s \cdot S_{allow,B}}{S_{allow,A}}\right)};$$ (Equation No. 2)

$$\text{where pitch} \equiv P = w_A + w_B;$$ (Equation No. 3)

where:
s = confidence offset ratio, set to 1 for equal factors of safety;
$S_{allow,A}$ = allowable shear stress of the first structural member (352); and
$S_{allow,B}$ = allowable shear stress of the second structural member (354).

In FIGS. 3A & 3B, first structural member 352 is made from a first material. The second structural member 354 is made from a second material, with the first and second materials having different material strengths. The first material (the material of the first structural member 352) has a lower material strength than the second material (the material of the second structural member 354).

The threading engagement in the BEST joint 300 is characterized by the plurality of threads 370 on the outer surface 362 of the first structural member 352 threadingly-engaging with the plurality of threads 372 on the threaded inner surface 366 of the second structural member 354. Thread relief 374 is used, as needed. The threading engagement creates a biased thread thickness distribution between the first and second structural members 352 and 354, which causes the first structural member and the second structural member to have substantially equal (sometimes referred to as nearly equal) shear tear-out structural strengths. This is notable because the respective parts (the first structural member 352 and the second structural member 354) are made of vastly different materials.

The threading engagement in the BEST joint 300 is characterized by the plurality of threads 370 on the outer surface 362 of the first structural member 352 threadingly-engaging with the plurality of threads 372 on the threaded inner surface 366 of the second structural member 354. The threading engagement is accomplished by the plurality of threads 370 on the outer surface 362 of the first structural member 352 and the plurality of threads 372 on the threaded inner surface 366 of the second structural member 354 having the same twist rate/helical pitch. Additionally, the respective thread thicknesses are portioned from the consistent pitch in Equation No. 3 above.

Notably, the fabricated embodiment 300 in FIGS. 3A & 3B had a pitch of 0.330 inches, but pitch values ranging from 0.1 inch to 3 inches may also be used, without detracting from the merits or generalities of the embodiments. These values are greater than typical values that do not employ the disclosed embodiments. There are nearly endless combinations of material combinations possible for the first and second structural members 352 and 354. Some, although certainly not all, of the material combinations are shown in TABLE I below.

TABLE I

Structural Member Material Combinations - First Structural Member (352) Mated with Second Structural Member (354)

| First Structural Member (352) Material | Second Structural Member (354) Material |
| --- | --- |
| 40% Long Glass Fiber Reinforced Polymer | AISI-4340 Steel |
| 40% Long Glass Fiber Reinforced Polymer | 17-4 PH Stainless Steel |
| Reinforced or Non-Reinforced Polymer | Aluminum |
| Reinforced or Non-Reinforced Polymer | Steel |
| Reinforced or Non-Reinforced Polymer | Stainless Steel |

Figure 2A:
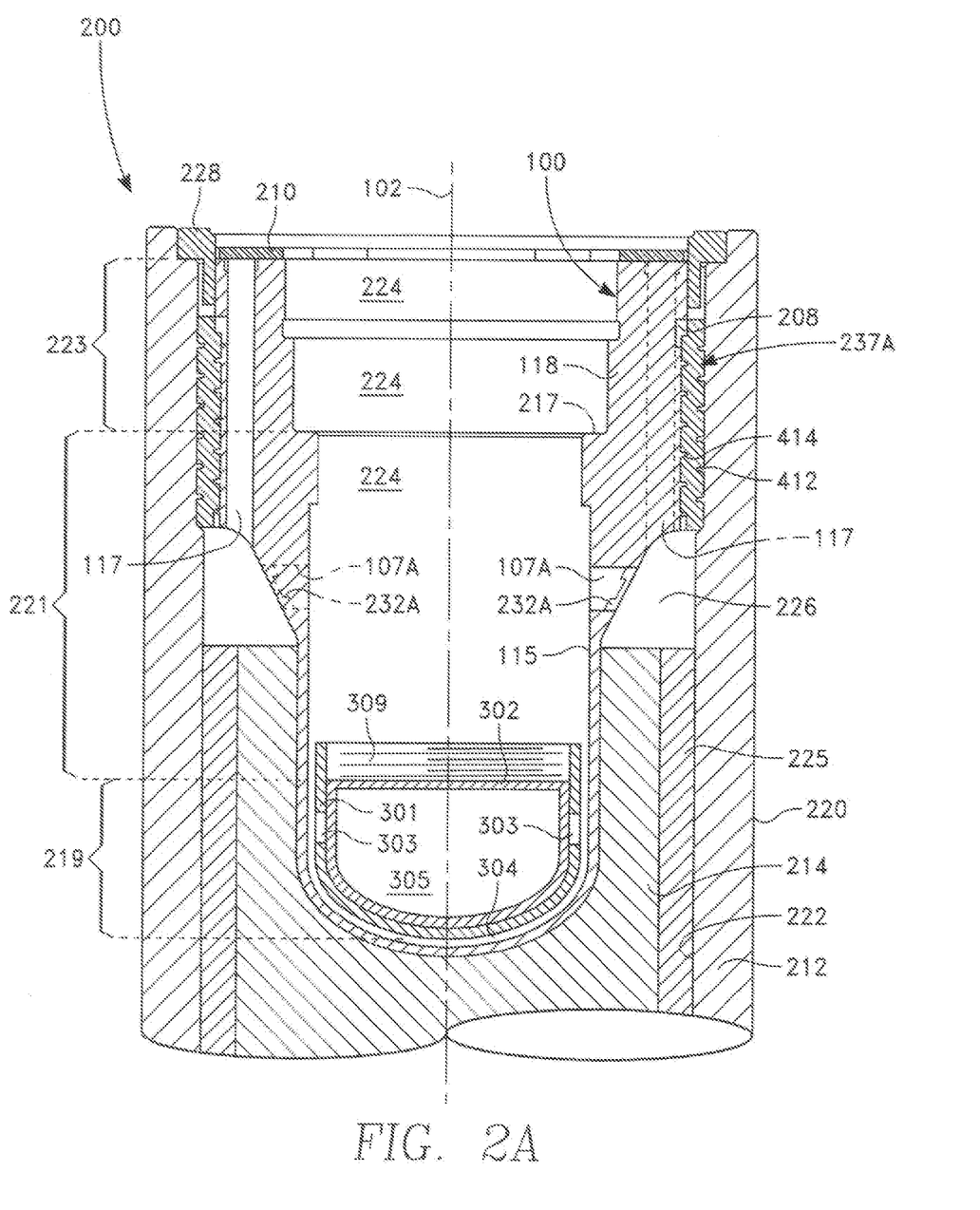
FIG. 2A is a section view of the operating environment shown in FIG. 1, showing an insensitive munitions mechanism, in the aft end of a generic munition.
Figure 4A:
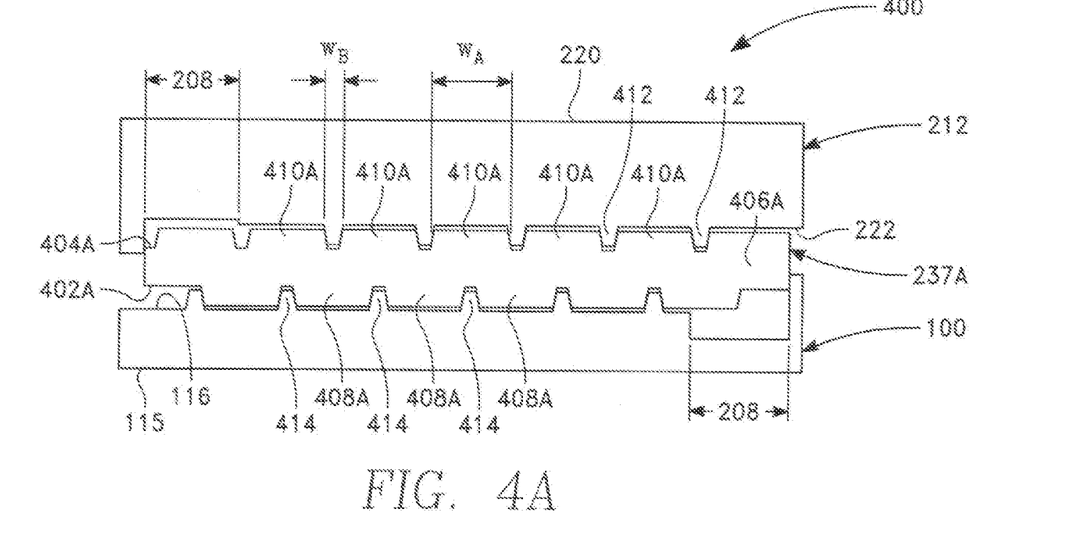
FIG. 4A is a close-up section view of a portion of the FIG. 2A operating environment.

Insensitive Munitions Embodiments - FIGS. 2A & 4A

Figure 1:
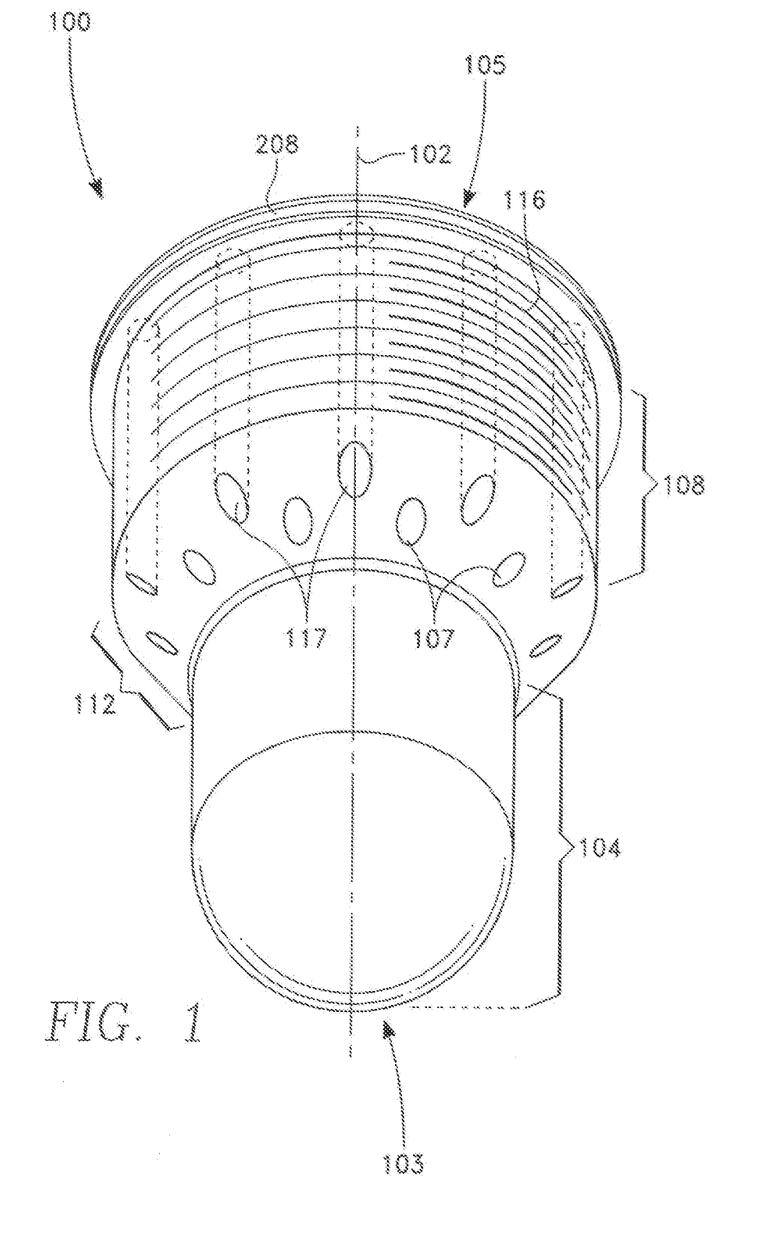
FIG. 1 is a perspective view of an operating environment, according to some embodiments.

Referring to the general operating environment in FIG. 1 and the FIG. 2A insensitive munitions section view, another embodiment includes a fuzewell 100 centered about a central longitudinal axis 102. FIG. 4A and its close-up section view 400 is used at times to show certain structural features. The central longitudinal axis 102, although depicted in somewhat exaggerated form for ease of viewing, is depicted in FIGS. 1, 2A, 2B, 2C, and 3B to show that it is common to all components in those figures and can, therefore, also be referred to as a common longitudinal axis. The central longitudinal axis 102 is used as a reference feature for orientation.

The fuzewell 100 can be aluminum, steel, stainless steel, Silicon Aluminum Metal Matrix Composite, and other high strength materials. The fuzewell 100 is hollow and can be referred to as a hollow fuzewell, vented fuzewell, vented plug, and other similar terminology without detracting from the merits or generalities of the embodiments. The fuzewell 100 has a proximal end 103, a distal end 105, an inner surface 115 (FIG. 2A), an outer surface 116, a first outer portion 104, and a second outer portion 108. The first and second outer portions 104 & 108 are separated by a flared region 112. The first and second outer portions 104

& 108 have corresponding diameters, sometimes referred to as first and second diameters.

The inner surface 115 and outer surface 116 of the fuzewell 100 define a wall 118. The proximal end 103 of the fuzewell 100 is closed and is a semi-ellipsoidal shape for strength in penetration. The outer surface 116 is threaded along the second outer portion 108 and, at times, is referred to as the threaded outer surface. A thread relief 208 is shown at the distal end 105.

The first outer portion 104 corresponds to the proximal end 103 and the second outer portion 108 corresponds to the distal end 105. As shown in FIG. 1, the first outer portion's 104 corresponding diameter is smaller than the second outer portion's 108 corresponding diameter. In the embodiments, the flared region 112 transitions from the first outer portion 104 (first diameter) to the second outer portion 108 (second diameter).

In FIG. 2A, depicted by reference character 200, a section view of the embodiment in FIG. 1 is shown. The cut plane for the section view in FIG. 2A is along the central longitudinal axis 102. The inner surface 115 of the fuzewell 100 defines a fuzewell inner envelope 224. The fuzewell inner envelope 224 has a first inner portion 219, a second inner portion 221, and third inner portion 223. The first inner portion 219 is located at the proximal end 103. The first inner portion 219 transitions to the second inner portion 221 and the second inner portion transitions to the third inner portion 223. The third inner portion 223 is located at the distal end 105.

As shown in FIG. 2A, the first, second, and third inner portions 219, 221, & 223 are centered about the central longitudinal axis 102. A booster housing 301 is inside the fuzewell 100 at the proximal end 103. A conduit 304, which can also be referred to as an air gap conduit, is concentric about the booster housing 301, and separates the booster housing from the inner surface 115 at the proximal end 103. The air gap conduit 304 is a channel for expanding gases during a cook-off event. As shown in FIG. 2A, the positioning of the booster housing 301 corresponds to the first inner portion 219 separated by the air gap conduit 304 to the inner surface 115 of the interior of the fuzewell 100.

The booster housing 301 is a metal sleeve, such as steel or aluminum alloys, for encapsulating booster components. As shown in FIG. 2A, the booster housing 301 has a plurality of circumferentially-spaced holes 303 penetrating through the booster housing. The booster housing 301 is open on its aft end (the end where the booster housing attaches to a munition fuze). The munition fuze is not shown for ease of viewing in the figures. Additionally, a person having ordinary skill in the art is familiar with munition fuzes. Furthermore, the components that house and cushion the munition fuze are shown in various figures and discussed in detail.

Booster housing 301 attachment to the fuze is by threading engagement. The threading engagement of the booster housing 301 into the fuze is by a threaded interface 309 at the aft end of the booster housing. The threaded interface 309 is configured to threadingly-engage with the fuze.

The circumferentially-spaced holes 303 are evenly-spaced at equal distance about the perimeter of the booster housing 301 with a range of about three to about twelve holes. The circumferentially-spaced holes 303 are shown in FIG. 3 as being circular, although any shape can be used. The booster housing 301 is concentric about a thermally-softening booster cup 302, which can also be referred to as a thermally-softening booster sleeve, or simply booster cup or booster sleeve. The booster housing 301 and booster cup 302 are bonded together.

Although not specifically shown in FIG. 2A for ease of viewing, a person having ordinary skill in the art will recognize that the booster cup 302 is a two-piece component, with the first piece being the portion adjacent to the booster housing 301 and the second piece being the portion that is closest to the fuze. The booster cup 302 is a polymer or reinforced polymer. Reinforcement is provided by embedded glass or carbon fibers which are not shown in the drawings for ease of view. The booster cup 302 houses a booster energetic 305. For viewing ease, the booster energetic 305 is not hatched in FIG. 2A.

As shown in FIGS. 1 and 2A the embodiments employ a plurality of longitudinal vents 117 as a mechanism to incite thermal softening, sometimes referred to as degradation, of the BEST release ring 237A, to provide secondary vent paths. The plurality of longitudinal vents 117 may not be needed in all munitions. The plurality of longitudinal vents 117 are circumferentially-spaced at equal distance in the wall 118 of the hollow fuzewell 100 based on the burning rate of the main fill energetic 214. The plurality of longitudinal vents 117 are parallel to the central longitudinal axis 102, spanning longitudinally from the outer surface 116 at the flared region 112 and through the wall 118 defined by the inner 115 and outer surfaces to the distal end 105. The plurality of longitudinal vents 117 are elongated apertures that can have a cylindrical shape, a square ended annular sector, a rounded annular sector shape, ellipsoidal shape, or other shapes, including reniform, without detracting from the merits or generalities of the embodiments. Due to the fuzewell's geometry depicted in FIG. 1, the plurality of longitudinal vents 117 at the flared region 112 present a semi-elliptical shape.

Embodiments can include a primary vent path for the booster energetic 305 offering additional IM benefits. The booster energetic venting features are depicted in FIG. 1 as a plurality of radial apertures 107, that can also be referred to as a plurality of radially-located apertures, radial holes, and similar terms. Each radially-located aperture 107 is an opening at the flared region 112 of the outer surface 116, and provides venting of the booster energetic 305 into an ullage space 226. Each radial aperture 107 has its proximal end at the inner surface 115 and its distal end at the flared region 112 of the outer surface 116.

Referring to FIGS. 2A and 4A (the close-up section view depicted with reference character 400), a biased equivalent strength threaded (BEST) release ring 237A, sometimes referred to as a release ring or releasable ring, is concentric about the fuzewell 100. The BEST release ring 237A has a threaded inner surface 402A and a threaded outer surface 404A. A wall 406A in the BEST release ring 237A is defined by the threaded inner surface 402A and the threaded outer surface 404A.

Figure 2B:
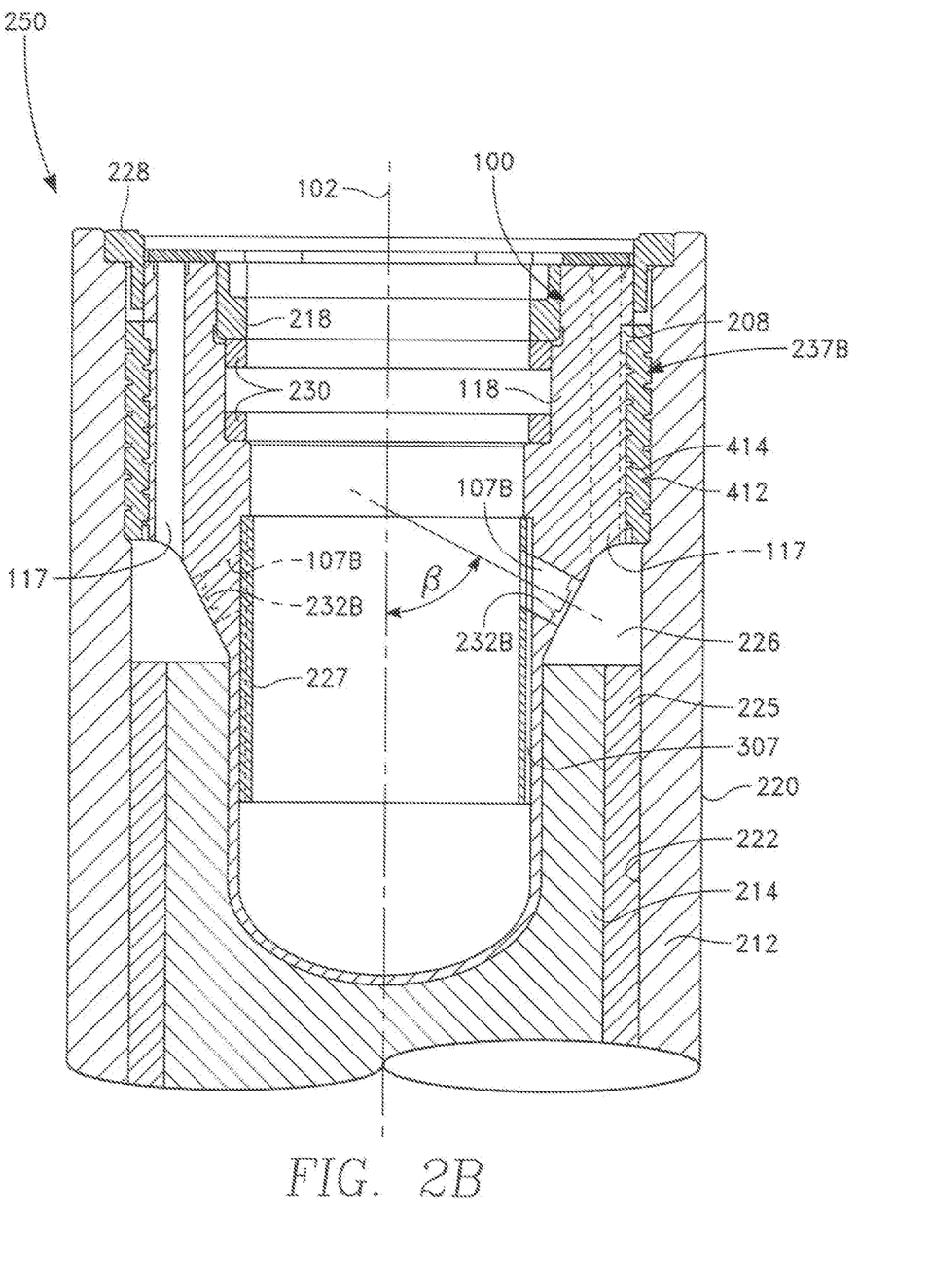
FIG. 2B is a section view of the operating environment shown in FIG. 1, showing a shock mitigation mechanism, in the aft end of a generic munition.
Figure 2C:
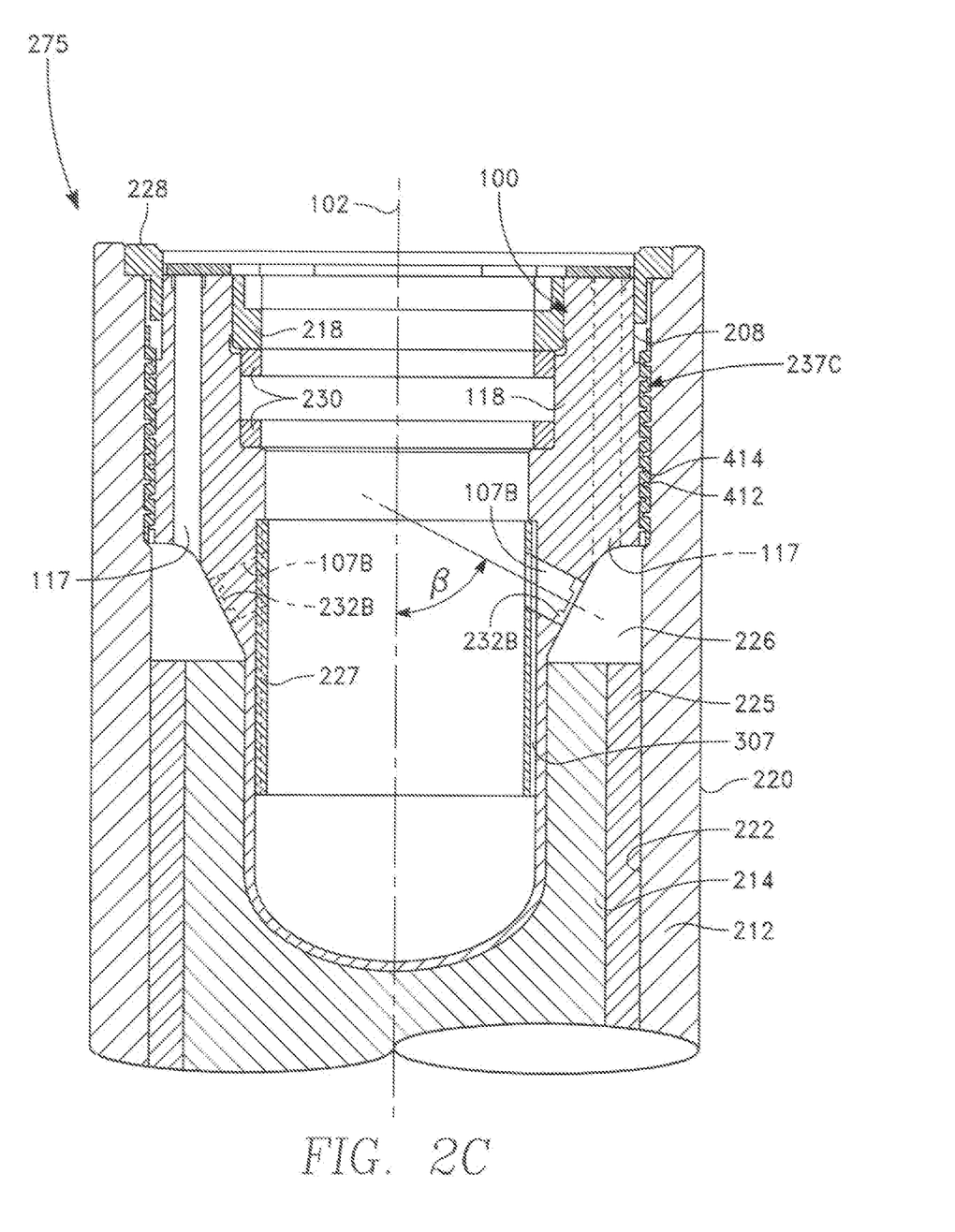
FIG. 2C is a section view of the operating environment shown in FIG. 1, showing an alternative shock mitigation mechanism, in the aft end of a generic munition.

The BEST release ring 237A threads onto the threaded outer surface 116 of the fuzewell 100, especially with respect to the second outer portion 108. As shown in FIG. 2A, the BEST release ring 237A is concentric about the fuzewell 100, spanning most of the second outer portion 108 with appropriate thread relief 208 included, as needed. As discussed later, a variation of the BEST release ring 237A used in shock mitigation embodiments is shown in FIGS. 2B and 2C for a shock damping rings 237B and 237C, respectively.

The threaded inner surface 402A of the BEST release ring 237A has a plurality of inner surface threads 408A with a thread thickness of $w_A$, measured at its pitch diameter. The threaded outer surface 404A of the BEST release ring 237A has a plurality of outer surface threads 410A. The plurality of outer surface threads 410A has have a thread thickness of $w_A$, measured at its pitch diameter.

The inner surface 222 of the munition case 212 is threaded, sometimes referred to as a munition case threaded inner surface and the like. The BEST release ring 237A is an adaptor between the fuzewell 100 and the munition case 212. The BEST release ring 237A is a weaker material, i.e. lower strength material, than both the fuzewell 100 and the munition case 212. The threaded inner surface 222 of the munition case 212 is characterized by a plurality of inner surface threads 412 having a thread thickness of $w_B$, measured along its pitch diameter. The threaded inner surface 222 of the munition case 212 spans longitudinally the entire longitudinal length of the BEST release ring 237A and the length of the threaded outer surface 116 of the fuzewell 100.

The threaded outer surface 116 of the hollow fuzewell 100 is along the second outer portion 108. The threaded outer surface 116 is characterized by a plurality of threads 414 with thread thickness of $w_B$. The thread thickness of $w_B$ of the inner surface threads 412 of the inner surface 222 of the munition case 212 and the thread thickness $w_B$ of the plurality of threads 414 on the threaded outer surface 116 of the hollow fuzewell 100 are shown equal to each other, but are not required to be equal.

The thread thickness for each mating pair of threads is determined independently from another, based on geometry and loading requirements. An example of mating pairs in FIG. 4A is shown by the threads depicted with reference characters 412 and 410A. Similarly, another example of mating pairs in FIG. 4A is shown by the threads depicted with reference characters 414 and 408A.

For instance, and as a reference, the plurality of inner surface threads 412 (on the threaded inner surface 222 of the munition case 212) are mated with the outer surface threads 410A (on the outer surface 404A of the BEST release ring 237A), and their respective thread thicknesses are determined independently from other mating pairs (such as those identified by reference characters 414 and 408A).

Similarly, the plurality of threads 414 (on the outer surface 116 of the fuzewell 100) are mated with the plurality of inner surface threads 408A (on the inner surface 402A) of the BEST release ring 237A), and their respective thread thicknesses are determined independently from other mating pairs. However, each pair of mating threads (the inner surface threads 412 and the plurality of threads 414) are not equal to the thread thickness $w_A$ for the inner surface threads 408A and outer surface threads 410A of the BEST release ring 237A. In layman's terms, $w_A$ is not equal to $w_B$. The thread approaches a standard thread when $w_A$ equals $w_B$.

The inner surface threads 408A of the BEST ring 237A threadingly-engage with the threads 414 on the outer surface 116 of the fuzewell 100 along the second outer portion 108. Likewise, the outer surface threads 410A of the BEST ring 237A threadingly-engage with the inner surface threads 412 on inner surface 222 of the munition case.

The number of longitudinal vents 117 is a range of about three to about twelve vents, with the vents equally-spaced from each other. The number of radial apertures 107 is also a range of about three to twelve apertures, with the apertures equally-spaced from each other. The longitudinal vents 117 and radial apertures 107 are staggered in alternating fashion.

Orientations of the radially-located apertures 107 are shown in the section views of FIGS. 2A and 2B by reference characters 107A and 107B, respectively. FIG. 2A shows the radial aperture 107A in an orthogonal orientation to the central longitudinal axis 102. Angle β in FIG. 2B depicts the 30 to 90 degrees orientation of the radial apertures 107B in FIG. 2B and specifically shows the radial aperture at less than 90 degrees from the central longitudinal axis 102. It is understood by a person having ordinary skill in the art that angle β is also present in FIG. 2A and representative of a 90 degrees angle from the central longitudinal axis 102, i.e. perpendicular to the central longitudinal axis.

A vent plug (232A & 232B in FIGS. 2A and 2B, respectively) is positioned in the distal end of each radial aperture 107, and can be referred to as vent covers and plugs. The plugs 232A/232B attach to the fuzewell 100 at the flared region 112 of the outer surface 116 with screws, threaded interfaces, and/or close fit with adhesive sealant to prevent cross contamination or debris during operational temperatures. The plugs 232A/232B melt, soften, or otherwise release at higher temperatures, i.e. during cook-off events.

A fuzewell liner 227 (FIG. 2B) is affixed to the fuzewell's inner surface 115. The fuzewell liner 227 has a plurality of longitudinal grooves 307 (shown in FIG. 2B) that are parallel to the central longitudinal axis 102. The longitudinal grooves 307 can also be referred to as longitudinal vent grooves and other similar terminology. The longitudinal grooves 307 can be an annular sector shape, a rounded annular sector shape, a reniform shape, cylindrical shape, an ellipsoidal shape transposed onto a curved axis, and other shapes. The longitudinal grooves 307 are circumferentially-spaced at equal distance from each other about the perimeter of the fuzewell liner 227 and are adjacent to the fuzewell's inner surface 115. The longitudinal grooves 307 span the length of the fuzewell liner 227 and are conduits allowing expanding gases from the fuze booster to transverse aft to and out the radial apertures 107A/107B. Spaces between the longitudinal grooves 307 are raised and are referred to as annular sectors or ribs. The annular sectors/ribs in the fuzewell liner 227 are much smaller in width than the diameter of the radially-located apertures 107A/107B, and are therefore not shown for ease of viewing. The annular sectors/ribs ensure that vent paths remain tolerant of misalignment of one another to provide fuze booster venting. The fuzewell liner 227 and associated longitudinal grooves 307 also assist with shock mitigation.

The distal end 105 of the fuzewell 100 is open. A sealing vent cover 210 is attached to the distal end 105 of the fuzewell 100. As shown in FIG. 2A, the sealing vent cover 210 is attached at the aft end (i.e. the distal end 105) of the longitudinal vents 117. The sealing vent cover 210 has stress riser grooves (not shown for ease of view) to ensure proper opening. A munition casing 212, also referred to as munition case, is concentric about the BEST release ring 237A. The munition casing 212 is steel or aluminum and has an outer surface 220 and an inner surface 222. The inner surface 222 is threaded to match threads on the releasable ring 237A. The munition casing 212 is configured to house a main fill energetic 214. The proximal end 103 of the fuzewell 100 is at least partially enveloped by the main fill energetic 214.

A portion of the inner surface 222 of the munition casing 212 is lined with an interior liner 225. The interior liner 225 can be either a protective liner or a reactive liner separating the munition casing 212 from the main fill energetic 214. Suitable protective liner materials include asphaltic hot melt, wax coating, and plastic. The ullage space 226 is an open space/void defined by the flared region 112, the plurality of longitudinal vents 117, the releasable ring 237A, the inner surface 222 of the munition case 212, the munition case liner 225 (or reactive liner), and the main fill energetic 214.

A synthetic felt pad or foam pad is used in some munitions to provide ullage space, but it is not needed in all munitions, and is not shown in the figures for ease of view. Internally, the fuzewell inner envelope 224 is depicted as open space inside the fuzewell 100 in FIG. 2A. The fuzewell inner envelope 224 is configured to house the munition fuze.

The BEST release ring 237A is a glass or carbon reinforced polymer. In some embodiments, the BEST release ring 237A is about 40 percent glass fiber, with the remainder being a thermoplastic or thermosoftening plastic such as, for example, polyurethane plastic. In other embodiments, the BEST release ring 237A can be a range of about 20 percent to about 60 percent glass or carbon fiber, with a corresponding range of thermoplastic or thermosoftening plastic of about 80 percent to about 40 percent.

The sealing vent cover 210 is made of a weak polymer, such as acrylonitrile butadiene styrene (ABS), which is not reactive, can survive both hot and cold operational temperatures and does not cause foreign object damage (FOD) to aircraft. ABS will soften at very high temperatures. The sealing vent cover 210 has protrusions (not shown for ease of viewing) which locate and may protrude into the longitudinal vents 117. Channels (not shown for ease of viewing) are all-around the perimeter of the protrusions on the sealing vent cover 210 and provide a stress concentration to ensure full opening of the longitudinal vents 117. The sealing vent cover 210 is attached to the fuzewell 100 with screws which can also be configured to melt away, soften, or otherwise release at a temperature similar to the BEST release ring 237A. The screws are sometimes referred to as eutectic screws. The sealing vent cover 210 will either fly off, peel away, melt, or suffer ruptures in proximity to the longitudinal vents 117, depending on the specific cook-off event. Similarly, a vent cover retaining ring 228 is threaded and assists with sealing the fuzewell 100 to the munition case 212. The vent cover retaining ring 228 is made of a structural metal and is configured to release with the fuzewell 100 during cook-off events.

Shock Mitigation Embodiments - FIGS. 2B, 2C, 4B, & 5

FIGS. 2B, 2C, 4B, and 5 depict various shock mitigation system embodiments in the aft end of a munition. FIG. 2B is a section view of the operating environment shown in FIG. 1, showing a shock mitigation system 250 in the aft end of a munition. Reference character 250 is also representative of other embodiments, including mechanisms, apparatuses, and systems in the aft end of a munition. FIG. 2C is another section view of the operating environment shown in FIG. 1, showing an alternative shock mitigation system 275, in the aft end of a generic munition.

Figure 4B:
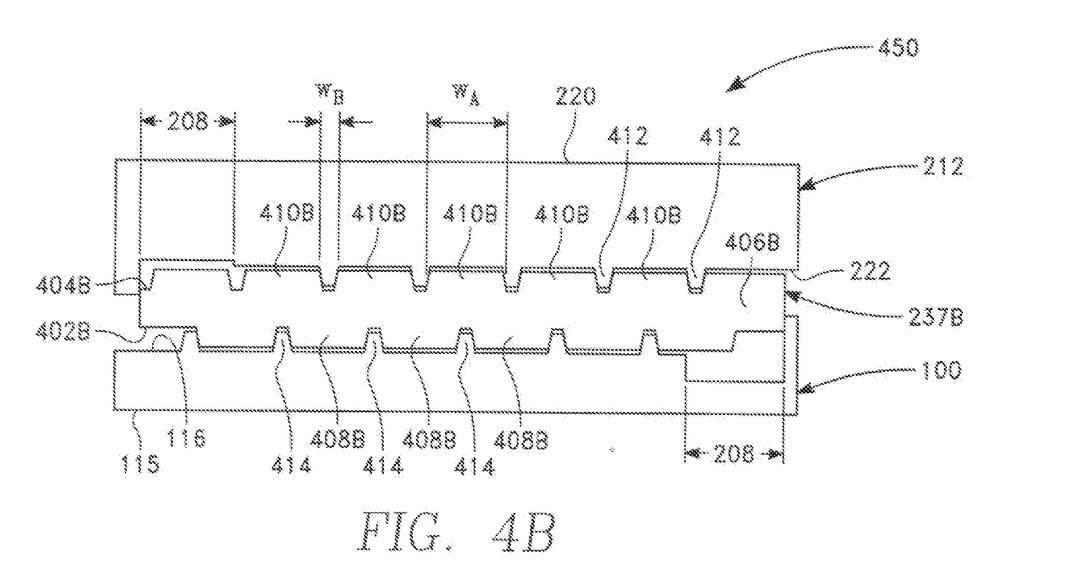
FIG. 4B is a close-up section view of a portion of the FIG. 2B operating environment, according to one embodiment.
Figure 5:
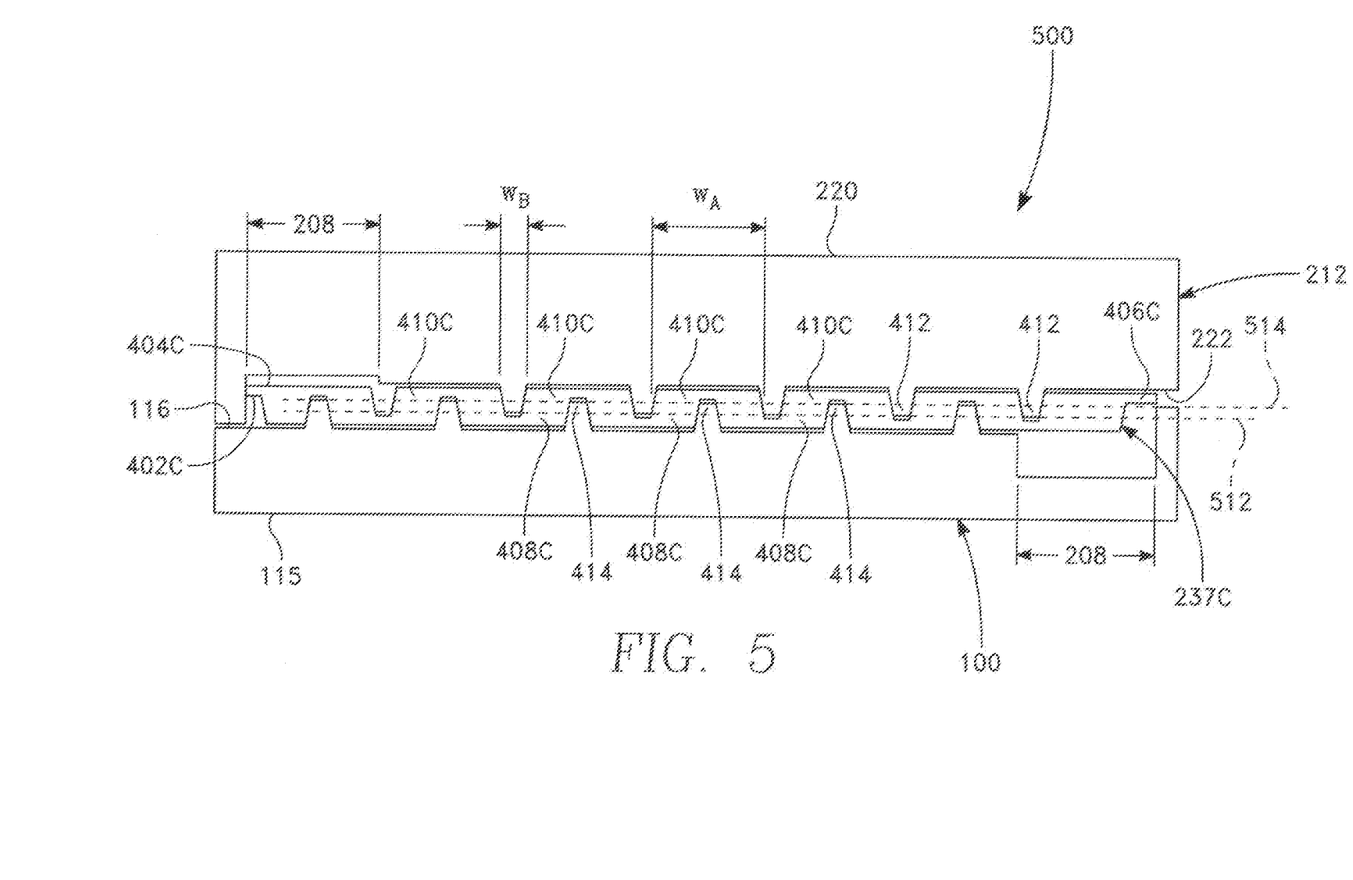
FIG. 5 is a closeup-section view of a portion of the FIG. 2C operating environment, according to another embodiment.

Some discussion below relies on FIG. 2A for viewing certain structural features. Due to the symmetry of the embodiments, the cut plane for the section views in FIGS. 2B and 2C is along the central longitudinal axis 102. FIG. 4B is a close-up section view of a portion of the FIG. 2B operating environment, and is depicted using reference character 450. Similarly, FIG. 5 is a close-up section view of a portion of the FIG. 2C operating environment, and is depicted using reference character 500 in FIG. 5. Referring to FIGS. 2B and 4B, a biased equivalent strength threaded (BEST) shock damping ring 237B is concentric about the hollow fuzewell 100. FIGS. 2C and 5 are used to depict a variation of the shock damping ring, depicted by reference character 237C, using an interfering threads approach. Specifically, the FIG. 5 close-up view best depicts the interfering threads, i.e. interference, approach.

The fuzewell liner 227 is sometimes referred to as a shock damping liner, especially in shock mitigation embodiments. The shock damping liner 227 is affixed to the perimeter of the inner surface 115 of the fuzewell 100. The shock damping liner 227 is configured to assist with cushioning the fuze by enveloping the fuze, thereby cushioning fuze electronics from transverse pyro and/or penetration shock waves. The shock damping liner 227 is a solid material having a density greater than foams but much lower than steel, thus having a lower stiffness compared to metals, similar to conductive ultra-high molecular weight, or low density polyethylene or high density polyethylene. To ensure low static electricity or otherwise conductive properties, the shock damping liner 227 material may include carbon. Suitable examples for the fuzewell liner/shock damping liner 227 include a plastic-carbon mix, conductive ultra high molecular weight polyethylene, low density polyethylene mixed with carbon, high density polyethylene mixed with carbon, polyamides (nylon), and polytetrafluoroethylene (PTFE), known by the DuPont brand name Teflon®.

At least one shock damping collar 230, also referred to as a fuze shock isolation ring, or shock mitigation ring is shown. The shock isolation ring 230 is a solid material with lower density, stiffness, and sound speed than steel, but with sufficient strength to constrain the fuze and the fuze retaining ring preload. Suitable materials include polymers (plastics) such as delrin, acetal homopolymer, ultem, nylon. As shown in FIG. 2B, the shock damping collar/shock isolation ring 230 is two collars. Although not shown in the figures, the two collars of the shock isolation ring 230 are positioned to accommodate a fuze flange that protrudes and is sandwiched between the two collars of the shock isolation ring 230.

In FIG. 2B, the fuze shock isolation ring 230 is depicted as two collars that are configured to sandwich a locating feature (a fuze flange that is not shown in FIG. 2B for ease of viewing) and are retained by a steel fuze retaining ring 218, which is sometimes referred to as a fuze retaining ring 218. The fuze retaining ring 218 is attached about the perimeter of the third inner portion 223 of the inner surface 115 and securely retains the shock isolation ring 230 and fuze in place within the fuzewell inner envelope 224. The shock isolation ring 230 acts on the fuze by providing an impedance mismatch as well as damping the shock incurred during penetration or a pyroshock event, thus significantly attenuating the shock experienced by the munition fuze. The fuzewell inner envelope 224 can also have a step 217, or transition, from the second inner portion 221 to the third inner portion 223.

The shock damping ring 237B is a glass or carbon reinforced polymer. In some embodiments, the shock damping ring 237B is about 40 percent glass or carbon fiber, with the remainder being polyurethane plastic or other suitable binder/matrix material. In other embodiments, the shock damping ring 237B can be a range of about 20 percent to about 60 percent carbon fiber, fiber glass, or aramid reinforcement, with a corresponding polymer binder range of about 80 percent to about 40 percent.

The shock damping ring 237B is threaded and threads onto the threaded outer surface 116 of the fuzewell 100, especially with respect to the second outer portion 108. As shown in FIG. 2B, the shock damping ring 237B is concentric about the fuzewell 100, spanning most of the second outer portion 108 with thread reliefs 208, as needed.

In the FIG. 4B close-up section view depicted with reference character 450, a biased equivalent strength threaded (BEST) shock damping ring 237B is concentric about the hollow fuzewell 100. The BEST shock damping ring 237B has a threaded inner surface 402B and a threaded outer surface 404B. A wall, referred to as a BEST shock damping ring wall 406B is defined by the threaded inner surface 402B and the threaded outer surface 404B. The munition case 212 is concentric about the BEST shock damping ring 237B. The BEST shock damping ring 237B is an adaptor between the fuzewell 100 and the munition case 212. The BEST shock ring 237B is a weaker material, i.e. lower strength material, than both the fuzewell 100 and the munition case 212.

The threaded inner surface 402B of the BEST shock damping ring 237B has a plurality of inner surface threads 408B. Each thread in the plurality of inner surface threads 408B has a thread thickness of $w_A$, measured at its pitch diameter and determined independently from other references to $w_A$. The threaded outer surface 404B also has a plurality of outer surface threads 410B. Each thread in the plurality of outer surface threads 410B also has a thread thickness of $w_A$, measured at its pitch diameter and determined independently from other references to $w_A$. The munition case 212 has a threaded inner surface 222 having a plurality of threads 412 with a thread thickness, $w_B$ measured along its pitch diameter and determined independently from other references to $w_B$. Likewise, the threaded outer surface 116 of the hollow fuzewell 100 along the second outer portion 108 has a plurality of threads 414 with a thread thickness, $w_B$, measured along its pitch diameter and determined independently from other references to $w_B$.

The thread thickness for each mating pair of threads is determined independently from another, based on geometry and loading requirements. An example of mating pairs in FIG. 4B is shown by the threads depicted with reference characters 412 and 410B. Similarly, another example of mating pairs in FIG. 4B is shown by the threads depicted with reference characters 414 and 408B.

For instance, and as a reference, the plurality of inner surface threads 412 (on the threaded inner surface 222 of the munition case 212) are mated with the outer surface threads 410B (on the outer surface 404B of the BEST shock damping ring 237B), and their respective thread thicknesses are determined independently from other mating pairs (such as those identified by reference characters 414 and 408B).

Similarly, the plurality of threads 414 (on the outer surface 116 of the fuzewell 100) are mated with the plurality of inner surface threads 408B (on the inner surface 402B) of the BEST shock damping ring 237B), and their respective thread thicknesses are determined independently from other mating pairs. However, each pair of mating threads (the inner surface threads 412 and the plurality of threads 414) are not equal to the thread thickness $w_A$ for the inner surface threads 408B and outer surface threads 410B of the BEST shock damping ring 237B. In layman's terms, $w_A$ is not equal to $w_B$. The thread approaches a standard thread when $w_A$ equals $w_B$.

Stated another way, the thread thicknesses associated with the BEST shock damping ring 237B are not equal to the thread thicknesses of the hollow fuzewell 100 or the munition case 212. The plurality of threads 408B on the threaded inner surface 402B of the BEST shock damping ring 237B threadingly-engage with the plurality of threads 414 on the threaded outer surface 116 of the second outer portion 108 of the fuzewell 100. Similarly, the plurality of threads 410B on the threaded outer surface of the 404B of the BEST shock damping ring 237B threadingly-engage with the plurality of threads 412 on the inner surface 222 of the munition case 212.

Shock Mitigation Using Interference - FIG. 5

In the FIG. 5 close-up section view depicted with reference character 500, an interfering threads approach is shown for shock mitigation. The embodiment includes a biased equivalent strength threaded (BEST) shock damping ring 237C concentric about the hollow fuzewell 100, as shown in FIG. 2C. The BEST shock damping ring 237C can also be referred to as an interference ring, interference shock damping ring, BEST interference shock damping ring, and similar variations due to the embodiment using interfering threads. The BEST interference shock damping ring 237C (FIGS. 2C and 5) is generally similar in many aspects to the BEST shock damping ring 237B (FIGS. 2B and 4B), including material compositions. Differences include geometries of threads, which affect timing and create interference, both of which are discussed herein. The BEST interference shock damping ring 237C has a threaded inner surface 402C and a threaded outer surface 404C, which collectively define a BEST shock damping ring wall 406C. The munition case 212 is concentric about the BEST interference shock damping ring 237C. The BEST interference shock damping ring 237C is an adaptor between the fuzewell 100 and the munition case 212. The BEST interference shock damping ring 237C is a weaker material, i.e. lower strength material, than both the fuzewell 100 and the munition case 212.

The threaded inner surface 402C of the BEST interference shock damping ring 237C has a plurality of inner surface threads 408C. Each thread in the plurality of inner surface threads 408C has a thread thickness of $w_A$, measured at its pitch diameter and determined independently from other references to $w_A$. The threaded outer surface 404C also has a plurality of outer surface threads 410C. Each thread in the plurality of outer surface threads 410C also has a thread thickness of $w_A$, measured at its pitch diameter and determined independently from other references to $w_A$. The munition case 212 has a threaded inner surface 222 having a plurality of threads 412 with a thread thickness, $w_B$ measured along its pitch diameter and determined independently from other references to $w_B$. Likewise, the threaded outer surface 116 of the hollow fuzewell 100 along the second outer portion 108 has a plurality of threads 414 with a thread thickness, $w_B$, measured along its pitch diameter and determined independently from other references to $w_B$.

The thread thickness for each mating pair of threads is determined independently from another, based on geometry and loading requirements. An example of mating pairs in FIG. 5 is shown by the threads depicted with reference characters 412 and 410C. Similarly, another example of mating pairs in FIG. 5 is shown by the threads depicted with reference characters 414 and 408C.

For instance, and as a reference, the plurality of inner surface threads 412 (on the threaded inner surface 222 of the munition case 212) are mated with the outer surface threads 410C (on the outer surface 404C of the BEST interference shock damping ring 237C), and their respective thread thicknesses are determined independently from other mating pairs (such as those identified by reference characters 414 and 408C).

Similarly, the plurality of threads 414 (on the outer surface 116 of the fuzewell 100) are mated with the plurality of inner surface threads 408C (on the inner surface 402C) of the BEST interference shock damping ring 237C), and their respective thread thicknesses are determined independently from other mating pairs. However, each pair of mating threads (the inner surface threads 412 and the plurality of threads 414) are not equal to the thread thickness $w_A$ for the inner surface threads 408C and outer surface threads 410C of the BEST shock damping ring 237C. In layman's terms, $w_A$ is not equal to $w_B$. The thread approaches a standard thread when $w_A$ equals $w_B$.

Stated another way, the thread thicknesses associated with the BEST interference shock damping ring 237C are not equal to the thread thicknesses associated with threads on the hollow fuzewell 100 or the munition case 212. The plurality of threads 408C on the threaded inner surface 402C of the BEST interference shock damping ring 237C threadingly-engage with the plurality of threads 414 on the threaded outer surface 116 of the second outer portion 108 of the fuzewell 100. Similarly, the plurality of threads 410C on the threaded outer surface of the 404C of the BEST shock damping ring 237C threadingly-engage with the plurality of threads 412 on the inner surface 222 of the munition case 212.

In the FIG. 5 interference embodiment, 500, each thread in the plurality of inner surface threads 408C and each thread in the plurality of outer surface threads 410C of the BEST interference shock damping ring 237C are timed. Additionally, each thread in the plurality of inner surface threads 408C and each thread in the plurality of outer surface threads 410C of the BEST interference shock damping ring 237C have equal or nearly equal thread thicknesses of $w_A$, measured its pitch diameter and determined independently from other references to $w_A$.

The plurality of threads 412 on the inner surface 222 of the munition case 212 and the plurality of threads 414 on the threaded outer surface 116 of the hollow fuzewell 100 are configured for interference with each other by their respective ends overlapping. This is evident in the FIG. 5 section view by comparing the geometry of respective ends/crests of the threads 412 & 414 being above and below opposing thread ends/crests. FIG. 5 illustrates the interference with dashed lines 512 and 514. Reference character 512 corresponds to the ends/crests of the plurality of inner surface threads 412 on the threaded inner surface 222 of the munition case 212. Reference character 514 corresponds to the ends/crests of the plurality of threads 414 on the threaded outer surface 116 of the fuzewell 100. The relationship between the ends/crests 512 of the plurality of threads 412 on the inner surface 222 of the munition case 212 and the ends/crests 514 of the plurality of threads 414 on the threaded outer surface 116 of the hollow fuzewell 100 is referred to as interfering or conflicting, the region between the sets of ends/crests defining an overlap zone or region.

This embodiment is a shock mitigation embodiment with higher strength material threads (the plurality of threads 412 on the munition case's inner surface 222 and the fuzewell's threaded outer surface's plurality of threads 414) configured for interference. The interference is best understood by realizing that the plurality of threads 412 on the munition case's inner surface and the fuzewell's threaded outer surface's plurality of threads 414 have a conflicting (i.e. interfering) mating geometry. Removal of the BEST interference shock damping ring 237C would cause nearly instantaneous conflict, i.e. interference, between the respective threads (reference characters 412 and 414), not allowing subsequent movement of any significance between the munition case 212 and the hollow fuzewell 100.

These threads depicted by reference characters 412 and 414 are comprised of high or higher strength material(s), in comparison to the BEST shock damping ring 237C material. The higher strength threads 412 and 414, in combination with a BEST shock damping ring 237C are oriented so that regardless if the shock damping ring fails, either of the threads in the higher strength material munition case 212 and/or fuzewell 100 would still have to fail in order for the joint (the combination shock damping ring sandwiched by the fuzewell and munition case) to separate. This is unlikely because of the higher strength and toughness of threads 412 and 414 compared to the BEST shock damping ring 237C. Instead, if the BEST shock damping ring 237C fails, the higher strength threads 412 and 414 will still interfere with each other, and therefore still maintain structural integrity and retain the munition fuze.

Theory of Operation

The embodiments enable an optimized non-permanent joint of two materials of dissimilar strengths and/or confidence, avoiding parasitic weight and volume of the high strength material being unnecessarily or overly strong as is common with current threads. The new thread construction is a constant pitch, conforming to the standard definition. A thread thickness for both male and female parts sized proportional to their allowable or yield strength(s), instead of equally as in standard threads. Any cross-section profile may be used such as those of Unified Screw Threads, Metric Screw Threads, Buttress Threads, Whitworth Threads, American National Standard Acme screw threads, and others.

Equation Nos. 1, 2, and 3 introduced earlier are valid for all embodiments. The mathematical relationships between thread pairs are determined on a pair-by-pair basis. The equations are applied to each respective threaded interface independently of another threaded interface, with weaker materials labeled with an "A" and stronger materials are labeled with a "B." Dissimilar strength or confidence in materials means the allowable shear stress of material A is less than that of material B, i.e. $S_{allow,A} \leq S_{allow,B}$. If desired, an additional offset s can be used to artificially account for differing confidence levels between materials. The goal of the below equation is to relate the estimated allowable shear stress of each material to the other by equating their individual factors of safety.

$$\frac{S_{allow,A}}{\tau_A} = n_A \cong s \cdot n_B = s \cdot \frac{S_{allow,B}}{\tau_B}, \text{ where} \quad \text{(Equation No. 4)}$$

$S_{allow,A}$: Allowable shear stress of material A;
$\tau_A$: Maximum estimated shear stress of material A;
$n_A$: Factor of safety for material A;
$S_{allow,B}$: Allowable shear stress of material B;
$\tau_B$: Maximum estimated shear stress of material B;
$n_B$: Factor of safety for material B; and
s: Confidence offset ratio used if a larger safety factor is desired in material A, used for greater variance in material properties or more unknowns exist in one material over the other, set to 1 for equal factors of safety.

Then, if the estimated thread tear-out shear stress is approximated by $\tau = \frac{F}{A}$, as is common in mechanical design where F is force and A is area, substituting this into the equation above yields:

$$\frac{w_A}{w_B} \cong \frac{A_A}{A_B} \cong s \cdot \frac{S_{allow,B}}{S_{allow,A}}, \text{ where} \quad \text{(Equation No. 5)}$$

$w_A$: Basic thread thickness for material A; and
$w_B$: Basic thread thickness for material B.

Equation No. 5 defines the appropriate proportionality ratio for thread thickness distribution between the low strength material A and high strength material B. This ensures an optimal thread form with each material being near equal in shear tear-out strength for permissible loading. The overall safety factor can then be tailored by adjusting the overall length of thread engagement. The above equations use the approximately equal symbol to allow the use of existing, standard thread cutting tools, thus minimizing production costs.

As discussed earlier, FIGS. 4A, 4B, and 5 illustrate mating pairs. The mating pairs can be further described as first and second mating pairs in the embodiments. A first mating pair is defined by threads having reference characters 408A and 414 in FIG. 4A, by threads having reference characters 408B and 414 in FIG. 4B, and by threads having reference characters 408C and 414 in FIG. 5. Similarly, a second mating pair is defined by threads having reference characters 410A and 412 in FIG. 4A, by threads having reference characters 410B and 412 in FIG. 4B, and by threads having reference characters 410C and 412 in FIG. 5.

The respective thread pairings allows for biased thread thickness distributions. Thus, the first mating pair of threads - reference characters 408A and 414 in FIG. 4A, reference characters 408B and 414 in FIG. 4B, and reference characters 408C and 414 in FIG. 5 - have a first biased thread thickness distribution, which causes the first mating pair of threads to have substantially-equal shear tear-out structural strengths. Similarly, the second mating pair of threads - reference characters 410A and 412 in FIG. 4A, reference characters 410B and 412 in FIG. 4B, and reference characters 410C and 412 and FIG. 5 -have a second biased thread thickness distribution, which causes the second mating pair of threads to also have substantially-equal shear tear-out structural strengths.

The novel structural features of the embodiments enable an optimized releasable (non-permanent) joint with thermally softening material sandwiched between two high strength materials. The thermally softening material is chosen such that it melts, thermally softens, or is otherwise designed to be compromised in specific environments. During such an environment, the strength of the sandwiched material is forfeit and thereby releases the joint of the two high strength materials. These concepts, when combined with the other disclosed IM components may offer substantial improvements in both SCO and FCO environments.

The BEST release ring 237A is threaded onto the fuzewell 100 and torqued to specification. Following this, the assembly of the releasable ring 237A and the fuzewell 100 are inserted into the inner surface 222 of the munition casing 212 and torqued to specification. The sealing vent cover 210 is then attached to the fuzewell 100 with adhesive or screws. If the stress concentrations or additional mechanisms are not included that ensure release, then the screws or adhesive are configured to melt away, soften, or otherwise release at temperature similar to the BEST release ring 237A.

The BEST release ring 237A melts or thermally softens such that its strength is removed. The fuzewell 100 features longitudinal vents 117 and radial apertures 107, through which the hot expanding gases from the main-fill energetic 214 and booster energetic 305 traverse, respectively. The radial apertures 107 redirect flow of the booster gases to impinge upon the free surface of the main-fill energetic 214 to initiate burning. The longitudinal vents 117 permit the expanding gases to then vacate the munition.

The embodiments optimize ignition. The booster energetic 305 is encapsulated and sealed within the thermally softening/releasing or otherwise disintegrating booster cup 302. The booster energetic 305 has a lower self-heating temperature, also known as a lower auto-ignition temperature, such that it ignites during an undesired thermal stimulus before the main fill 214 reacts. The booster energetic 305 quantity is small compared to the main fill energetic 214. During cook-off, the booster energetic 305 decomposes, making expanding hot gases that vent through the holes 303 into the fuzewell 100 and around the fuze.

The radially-located apertures 107 are configured to assist in transporting and directing the gases to impinge on the free surface of the main fill energetic 214. The decomposing booster energetic 305 ignites the main fill energetic 214 to burn, producing more expanding gases. The confluence of expanding gases exert opposing pressure acting to separate the fuzewell 100 from the rest of the munition. The radially-located apertures 107 are angled from about 30 degrees to about 90 degrees from the central longitudinal axis 102 and are oriented to vent the expanding internal gases inside the fuzewell 100 out to the ullage space 226 onto the exposed surface of the main fill energetic and then, ultimately out the longitudinal vents 117. The expanding gases from the main fill energetic 214 also vent through the longitudinal vents 117, which prevents excessive pressure build up.

The booster housing 301 and, specifically, its holes 303, can be sealed with a thin layer such as a burst disk. The booster housing 301 with holes 303 (also known as a booster assembly) is installed within the fuzewell 100 with the radial apertures 107 internal to the munition to transport expanding gases from the booster energetic 305 to the desired location.

The booster energetic 305 is an explosive and is chosen such that it has a lower self-heating temperature than the main fill energetic 214, while also providing the necessary elevation in output energy necessary to detonate or otherwise initiate the munition in design mode. The booster energetic 305 is a different explosive than the main fill energetic 214, and is conventionally already included in munitions in order to elevate energy output of fuzing to initiate the munition in design mode. Although, the booster energetic 305 can be a main fill-type of energetic. The radial apertures 107 working with longitudinal grooves 307 enable the booster energetic 305 to provide a dual purpose in relation to cook-off mitigation which allows less parasitic mass and volume compared to current configurations.

The fuzewell liner 227 holds the fuze concentric within the fuzewell to ensure uniformly distributed longitudinal grooves 307 interface evenly with the radial apertures 107. The desired location of the radial apertures 107 is typically near the free surface of the main fill energetic 214 in close proximity to the longitudinal vents 117 for venting exterior to the munition. The longitudinal vents 117 allow for more effective and complete drainage of the reactive liner 225 and the BEST release ring 237A.

The embodiments redirect the expanding gases produced by ignited energetics to enlarge vent paths (the longitudinal vents 117 and the BEST ring 237A) through erosion, enabling improved munition response to the SCO and FCO insensitive munitions tests. Increased erosion enables use of smaller vent paths than typically required, to enable use of stronger parts to satisfy penetration survivability and other operational requirements. Additionally, the unique thread features also compensate lower strength materials to satisfy penetration survivability.

The embodiments also enable an optimized non-permanent joint with a shock mitigating material sandwiched between two high strength and stiffness materials. The shock mitigating material is chosen such that it damps, attenuates, isolates or otherwise provides compliance to reduce accelerations transmitted through the joint during a specific set of environments. During these environments, the shock mitigating material reduces the accelerations transmitted through to subsequent sub-assemblies thereby reducing the severity of shocks and increasing the survivability of those sub-assemblies. These concepts, when combined with other disclosed shock mitigation components, may offer substantial improvements in shock mitigation and protection of munition fuzes.

The reduced interface due to the longitudinal vents 117 are constructed to further reduce shock energy transmitted to the fuze due to, but not limited to, loads during penetration and pyro-shock. As such, embodiments offer many positive aspects, including: shock damping, vent paths to prevent pressure build-up and violent release, maintaining penetration survivability/joint strength, multi-purpose booster material to start mild burning at vent location to preempt energetic run-away, and use of venting hot gases to enlarge vent holes as well as assist in release of fuzewell 100. Embodiments accomplish this without the negative aspects of: pent-up pressure release in violent events, compromised joint strength to enable fuzewell 100 release, permanent joints preventing disassembly for maintenance or assessment, single point of failure vent paths, parasitic mass or volume, and energetic main fill auto-ignition at undesired location.

The shock damping ring 237B and the interference shock damping ring 237C have a lower stiffness and density and thus more damping properties than typical metal parts. This results in an impedance mismatch across the interfaces. This additional damping, as well as impedance mismatch, results in reduced shock and vibrational pressures and stresses transferred to the fuze. Thus, the energy experienced by the shock damping ring 237B and the interference shock damping ring 237C, especially the portion adjacent to the longitudinal vents 117 and grooves 307, is not transferred to the fuzewell 100 or fuze. The longitudinal vents 117 reduce the interface area across which shocks can be transmitted, further reducing the shock transmitted to the fuze.

While the embodiments have been described, disclosed, illustrated and shown in various terms of certain embodiments or modifications which it has presumed in practice, the scope of the embodiments is not intended to be, nor should it be deemed to be, limited thereby and such other modifications or embodiments as may be suggested by the teachings herein are particularly reserved especially as they fall within the breadth and scope of the claims here appended.

What is claimed is:

1. A biased equivalent strength threaded (BEST) joint for dissimilar strength materials, comprising:
    a first structural member having a proximal end, a distal end, an inner surface, a threaded outer surface, and a wall defined by said inner surface and said outer surface, said first structural member centered about a central longitudinal axis;
    a second structural member having a threaded inner surface, a smooth outer surface, and a wall defined by said inner surface and said outer surface, said second structural member concentric about said first structural member, wherein said first and second structural members are configured to threadingly-engage with each other;
    wherein said threaded outer surface of said first structural member having a plurality of threads with a thread thickness, $w_A$;
    wherein said threaded inner surface of said second structural member having a plurality of threads with a thread thickness, $w_B$;
    wherein said thread thickness, $w_A$, of said threaded outer surface of said first structural member and said thread thickness, $w_B$, of said threaded inner surface of said second structural member are not equal;
    wherein said thread thickness, $w_A$, of said threaded outer surface of said first structural member is mathematically defined as:

$$w_A = \frac{P}{\left(1 + \frac{S_{allow,A}}{s \cdot S_{allow,B}}\right)};$$

wherein said thread thickness, $w_B$, of said threaded inner surface of said second structural member is mathematically defined as:

$$w_B = \frac{P}{\left(1 + \frac{s \cdot S_{allow,B}}{S_{allow,A}}\right)};$$

wherein pitch $\equiv P = w_A + w_B$;
    wherein s = confidence offset ratio, set to 1 for equal factors of safety;
    wherein $S_{allow,A}$ = allowable shear stress of said first structural member; and
    wherein $S_{allow,B}$ = allowable shear stress of said second structural member.

2. The BEST joint according to claim 1, wherein said threading engagement is characterized by said threaded outer surface of said first structural member threadingly-engaging with said threaded inner surface of said second structural member.

3. The BEST joint according to claim 1, wherein said first structural member is a made of a first material, wherein said second structural member is made of a second material, wherein said first and second materials have different material strengths.

4. The BEST joint according to claim 1, wherein said first structural member and said second structural member are made of different strength materials, wherein said first structural member is made of a first material, wherein said second structural member is made of a second material, wherein said first material has a lower material strength than said second material.

5. A biased equivalent strength threaded (BEST) joint for dissimilar strength materials, comprising:
    a first structural member having a proximal end, a distal end, an inner surface, a threaded outer surface, and a wall defined by said inner surface and said outer surface, said first structural member centered about a central longitudinal axis;
    a second structural member having a threaded inner surface, a smooth outer surface, and a wall defined by said inner surface and said outer surface, said second structural member concentric about said first structural member, wherein said first and second structural members are configured to threadingly-engage with each other;
    wherein said threaded outer surface of said first structural member having a plurality of threads with a thread thickness, $w_A$;

wherein said threaded inner surface of said second structural member having a plurality of threads with a thread thickness, $w_B$;

wherein said thread thickness, $w_A$, of said threaded outer surface of said first structural member and said thread thickness, $w_B$, of said threaded inner surface of said second structural member are not equal;

wherein said threading engagement is characterized by said threaded outer surface of said first structural member threadingly-engaging with said threaded inner surface of said second structural member;

wherein said first structural member and said second structural member are made of different strength materials, wherein said first structural member is made of a first material, wherein said second structural member is made of a second material, wherein said first material has a lower material strength than said second material, wherein said threading engagement creating a biased thread thickness distribution between said first and second structural members, wherein said biased thread thickness distribution causing said first structural member and said second structural members to have substantially equal shear tear-out structural strengths.

6. The BEST joint according to claim 5, further comprising:

wherein said thread thickness, $w_A$, of said threaded outer surface of said first structural member is mathematically defined as:

$$w_A = \frac{P}{\left(1 + \frac{S_{allow,A}}{s \cdot S_{allow,B}}\right)};$$

wherein said thread thickness, $w_B$, of said threaded inner surface of said second structural member is mathematically defined as:

$$w_B = \frac{P}{\left(1 + \frac{s \cdot S_{allow,B}}{S_{allow,A}}\right)};$$

wherein pitch $\equiv P = w_A + w_B$;

wherein $s$ = confidence offset ratio, set to 1 for equal factors of safety;

wherein $S_{allow,A}$ = allowable shear stress of said first structural member; and wherein $S_{allow,B}$ = allowable shear stress of said second structural member.

* * * * *